(12) United States Patent
Ehrsam (10) Patent No.: US 10,830,242 B2
(45) Date of Patent: Nov. 10, 2020

(54) CENTRIFUGAL PUMP WITH IMPELLER CENTERING AND VIBRATION DAMPENING

(71) Applicant: Bühler Motor GmbH, Nuremberg (DE)

(72) Inventor: Jürgen Ehrsam, Fürth (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 290 days.

(21) Appl. No.: 15/435,555

(22) Filed: Feb. 17, 2017

(65) Prior Publication Data

US 2017/0234314 A1   Aug. 17, 2017

(30) Foreign Application Priority Data

Feb. 17, 2016  (DE) .................. 10 2016 202 417

(51) Int. Cl.
  *F04D 13/06*  (2006.01)
  *F04D 29/66*  (2006.01)
  (Continued)

(52) U.S. Cl.
  CPC .......... *F04D 13/0633* (2013.01); *F04D 1/00* (2013.01); *F04D 13/0653* (2013.01); *F04D 29/026* (2013.01); *F04D 29/0413* (2013.01); *F04D 29/0465* (2013.01); *F04D 29/0467* (2013.01); *F04D 29/4273* (2013.01);
  (Continued)

(58) Field of Classification Search
  CPC .. F04D 13/06; F04D 13/0633; F04D 29/0413; F04D 13/026; F04D 1/00; F04D 29/026; F04D 29/0465; F04D 29/0467; F04D 29/047; F04D 29/22; F04D 29/043; F04D 1/04; F04D 29/056; F04D 29/063; F04D 29/586; F04D 29/624; F04D 29/669; F16C 2360/44; F16C 11/0661; F16C 17/02; F16C 17/04
  See application file for complete search history.

(56) References Cited

U.S. PATENT DOCUMENTS 4,013,384 A  *  3/1977  Oikawa ..................... F04D 3/02
                                                        417/368
6,443,710 B1 *  9/2002  Tatsukami .......... F04D 29/0413
                                                        417/365
(Continued)

FOREIGN PATENT DOCUMENTS

GB          210235 A  *  1/1924  ................ F01L 3/08

*Primary Examiner* — Dominick L Plakkoottam
(74) *Attorney, Agent, or Firm* — Westerman, Hattori, Daniels & Adrian, LLP (57) ABSTRACT

A centrifugal pump for delivering coolant in vehicles and providing a centering of a pump impeller and a dampening of motor vibrations. The centrifugal pump having a pump housing consisting of a pump head, which forms a single part with a suction nozzle, a discharge nozzle, a spoke, and a bearing support, in which a counter bearing is mounted, in which a first region of a shaft is supported, around which a pump impeller is rotatably mounted via a slide bearing secured in the pump impeller, the spoke retaining the bearing support in a central position within the pump head and having a containment shell, which separates a wet chamber from a dry chamber and in which a second region of the shaft is supported. The invention seeks to solve the problem of providing in a generic centrifugal pump.

19 Claims, 5 Drawing Sheets

(51) Int. Cl.
*F04D 29/42* (2006.01)
*F04D 29/02* (2006.01)
*F04D 1/00* (2006.01)
*F04D 29/046* (2006.01)
*F04D 29/041* (2006.01)
*F16C 23/04* (2006.01)
*F16C 17/04* (2006.01)
*F16C 11/06* (2006.01)

(52) U.S. Cl.
CPC ............ *F04D 29/669* (2013.01); *F16C 17/04* (2013.01); *F16C 23/048* (2013.01); *F05D 2230/20* (2013.01); *F05D 2250/711* (2013.01); *F05D 2250/712* (2013.01); *F16C 11/0661* (2013.01); *F16C 2360/44* (2013.01)

(56) References Cited

U.S. PATENT DOCUMENTS

| | | | | |
|---|---|---|---|---|
| 8,303,268 | B2* | 11/2012 | Werson | F04D 13/0646 310/156.32 |
| 9,771,938 | B2* | 9/2017 | Blankemeier | F04D 13/025 |
| 2005/0084396 | A1* | 4/2005 | Gutknecht | F01D 25/166 417/407 |
| 2013/0259706 | A1* | 10/2013 | Eslinger | F04D 7/04 417/53 |
| 2013/0266462 | A1* | 10/2013 | Bernreuther | H02K 1/145 417/420 |
| 2015/0051436 | A1* | 2/2015 | Spanier | A61M 1/1017 600/16 |
| 2015/0167542 | A1* | 6/2015 | Reinisch | F02B 37/186 417/405 |
| 2017/0302124 | A1* | 10/2017 | Ehrsam | F04D 13/06 |

* cited by examiner

CENTRIFUGAL PUMP WITH IMPELLER CENTERING AND VIBRATION DAMPENING

BACKGROUND OF THE INVENTION (1) Field of the Invention

The invention relates to a centrifugal pump, in particular for delivering coolant in vehicles, having a pump housing consisting of a pump head, which forms a single part with a suction nozzle, a discharge nozzle, a spoke, and a bearing support, in which a counter bearing is mounted. A first region of a shaft is supported in the counter bearing. Also on the shaft, a pump impeller is rotatably mounted via a slide bearing secured in the pump impeller. The spoke retains the bearing support in a central position within the pump head. A containment shell separates a wet chamber from a dry chamber and supports a second region of the shaft. A wound stator is accommodated in the dry chamber and a permanent magnet rotor of an electronically commutated direct-current motor is accommodated in the wet chamber and the permanent magnet rotor forms a structural unit with the pump impeller.

(2) Description of Related Art Including Information Under 37 CFR 1.97 and 1.99

In combustion engines found in motor vehicles, mechanical centrifugal pumps driven by the vehicle's crankshaft via a gear belt are generally provided as the main cooling water pump. As a support or an alternative in a shut-off combustion engine, electric ancillary cooling water pumps are used, which are generally designed as electronically commutated direct-current motors. As these pumps are arranged in close proximity or directly on the combustion engine, they are subjected to the high temperatures and vibration loads of the combustion engine. Additional vibrations can be generated by the electric motor and the hydraulic part of the cooling water pump itself. Main cooling water pumps can also be operated electrically and exhibit the same problems. Even electric vehicles require cooling water pumps, which take care of battery cooling, for example.

US 2013/0266462 A1 (which is incorporated by reference herein) discloses a generic cooling water pump in which a pump impeller is rotatably mounted on a central shaft. The shaft is supported and secured on one end in a containment shell and on the other end in a pump head. A hollow cylindrical slide bearing is a component of the pump impeller, the slide bearing being able to rest axially on flat end faces of counter bearings. One of the counter bearings is accommodated in the pump head in a bearing support, which is connected to the pump head via straight spokes. In this way, vibrations that occur during operation of the water pump are transferred largely undampened from the pump impeller to the pump head. In addition, noises occur as a result of variations of the radial position of the pump impeller around the shaft.

BRIEF SUMMARY OF THE INVENTION

The invention seeks to solve the problem of providing in a generic centrifugal pump a centering of the pump impeller and a dampening of the vibrations, which are transferred from the pump impeller to the pump head and thus to the housing of the centrifugal pump, whereby unpleasant noises are to be largely prevented.

This problem is solved as follows. A convex or concave axial bearing surface of a slide bearing interacts with a complementary concave or convex counter bearing surface of a counter bearing and effects a self-centering of the pump impeller within the pump chamber. As a result, radial oscillatory movements are minimized and the vibrations originating from the pump impeller are reduced. The additionally generated vibrations are dampened by means of at least one change in the direction of vibration between a bearing support and a suction nozzle. In the process, vibrational energy is converted to thermal energy by means of internal friction and transported away by the coolant. In this way, unpleasant noises are largely prevented or dampened.

As the result of a first transition region between a spoke and the bearing support being significantly spaced apart in the axial direction from a second transition region between the same spoke and the suction nozzle, vibrations can be coupled and transferred less directly so that a dampening effect occurs. This effect is achieved particularly if the first transition region does not axially overlap the second transition region.

It has proven to be advantageous if the spokes substantially protrude radially from the suction nozzle and axially transition into the bearing support. At least a change in direction for the vibration propagation by approx. 90° is achieved thereby. Each change in direction causes a dampening of vibrations.

Changes in direction are shown by inflection points in curves of the spokes. It is therefore suggested that the spokes describe a curve with at least one inflection point between the bearing support and the suction nozzle. An even better dampening is thus achieved, if the spokes describe a curve with at least two inflection points between the bearing support and the suction nozzle.

In order to reduce the tendency to oscillate from the start, a self-centering of the pump impeller is sought. For this reason, the axial bearing surface of the slide bearing should be designed to be convex and the counter bearing surface of the counter bearing should be designed to be concave so they can generally mate with each other. It is also conceivable to design the axial bearing surface of the slide bearing to be concave and the counter bearing surface of the counter bearing to be convex with the same results.

A convex axial bearing surface or a convex counter bearing surface is designed as a ball ring section, which is adjoined by a hollow cylindrical inner surface and a cylindrical outer surface.

Advantageously, three spokes are provided between the bearing support and the suction nozzle and form a single part with the pump head. However, one or two spokes are also conceivable.

A second embodiment of the invention provides that the slide bearing and/or the counter bearing has/have an annular collar, which serve as an axial stop.

Particularly in the second embodiment, it is advantageous that the radii of the axial bearing surfaces of the slide bearing and of the counter bearing differ slightly from one another so that contact occurs preferably in the region near the shaft. In this region, the friction radius is smaller, which results in a lower mechanical resistance. Furthermore, the stop surface is smaller than it would be in the case of equal radii, so that manufacturing inaccuracies can have a less negative effect. Through wear and tear over the service life, the stop surfaces can increase in size.

In order to avoid an over-determination, a small annular gap 38 is provided between the shaft 5 and the slide bearing 7 and the radial bearing takes place via the counter bearing 10 during operation. Due to pressure differences, an axial pull of the pump impeller in the direction of the suction nozzle exists, whereby the slide bearing 7 is kept abutted against the counter bearing 10. As a result of the spherical geometry of the axial bearing surfaces, the relatively small radial bearing forces can be absorbed. The pump impeller 6 is thereby centered on the counter bearing 10. The radial bearing surface of the slide bearing 7 essentially serves as a support in the idle state or when shocks act on the centrifugal pump from the outside.

According to an advantageous refinement of the invention, the slide bearing 7 and/or the counter bearing 10 are joined by master forming. This results in a very tight and close connection. In order to further increase the robustness of the connection, the slide bearing 7 and/or the counter bearing 10 have/has a knurling on the outer circumference. In this way, the surrounding material can be joined even better to the respective bearing during master forming.

For the slide bearing 7 and the counter bearing 10, different material pairings can be used, such as steel with steel or steel with plastic or ceramic with ceramic or ceramic with plastic. Carbon fiber plastic, in particular polyphenylene sulfide (PPS) with 30% carbon fibers, has proven to be a suitable plastic material. When steel is used as bearing material, the bearing is generally produced through cold forming. In order to achieve a high abrasion resistance, this bearing can be designed as a hardened steel bearing.

The pump head can consist of plastic material that can be processed by means of injection molding or, should there be higher requirements with respect to strength and heat dissipation properties, of a metal material that can be die cast, such as aluminum (aluminum die casting).

BRIEF DESCRIPTION OF THE SEVERAL VIEWS OF THE DRAWINGS

The invention is described below with exemplary embodiments that are explained in greater detail using the figures. They show.

The reference numbers with apostrophe and the corresponding reference numbers without apostrophe refer to details with the same name in the drawings and the drawing description. This reflects use in another embodiment, the prior art, and/or the detail is a variant. The claims, the description introduction, the reference number list and the abstract contain only reference numbers without apostrophe for the sake of simplicity.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
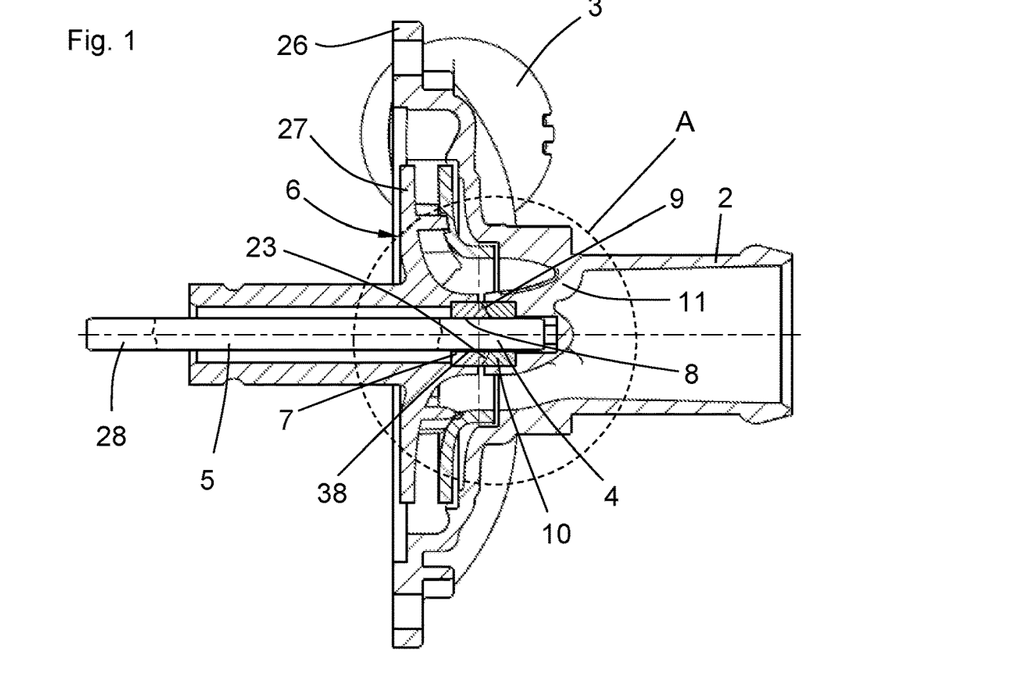
FIG. 1 is a sectional view of the centrifugal pump according to the invention.

FIG. 1 shows a sectional view with the parts of the centrifugal pump that are essential for the invention. Illustrated in particular are: a pump head 16, with a suction nozzle 2, a discharge nozzle 3, spokes 11, a bearing support 12, and a pump head flange 26. Furthermore a pump impeller 6 is arranged on a shaft 5. A slide bearing 7 is secured within the impeller 6, which rotatably mounts the pump impeller 6 via a radial bearing surface 8 onto the shaft 5 and is supported axially on a counter bearing 10 accommodated in the bearing support 12. At its front end, the slide bearing 7 has a convex spherical axial bearing surface 9, which fits and interacts with a concave counter bearing surface 23 of the counter bearing 10. The counter bearing 10 is secured in the bearing support 12 and serves both the axial bearing and the centering of the pump impeller 6. In this case, the pump impeller 6 is illustrated without a permanent magnet, which directly adjoins a vane 27. The shaft 5 is supported on a first region 4 in the bearing support 12 and on another second region 28 in a containment shell 30 not shown here.

Figure 2:
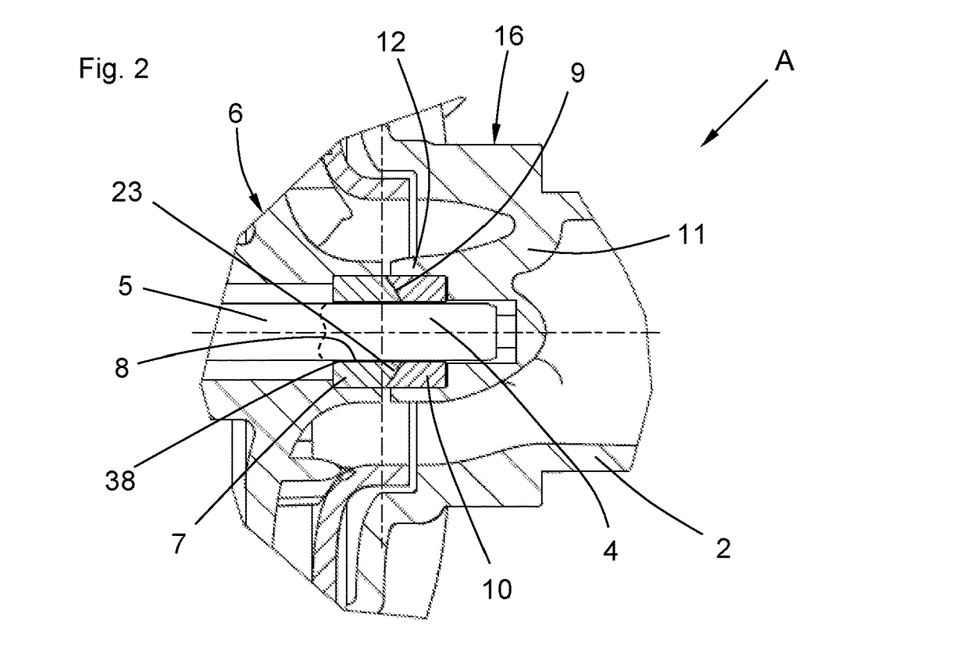
FIG. 2 is an enlarged section A of FIG. 1.

FIG. 2 shows the bearing region of the detail A of FIG. 1 somewhat enlarged, with the pump head 16, the suction nozzle 2, the spoke 11, the bearing support 12, the shaft 5, with its first region (end region) 4, the slide bearing 7, the counter bearing 10, the pump impeller 6. The radial bearing surface 8 as well as the spherical axial bearing surface 9 of the slide bearing 7 and the concave counter bearing surface 23 of the counter surface 10 can be seen more clearly here than in FIG. 1.

Figure 3:
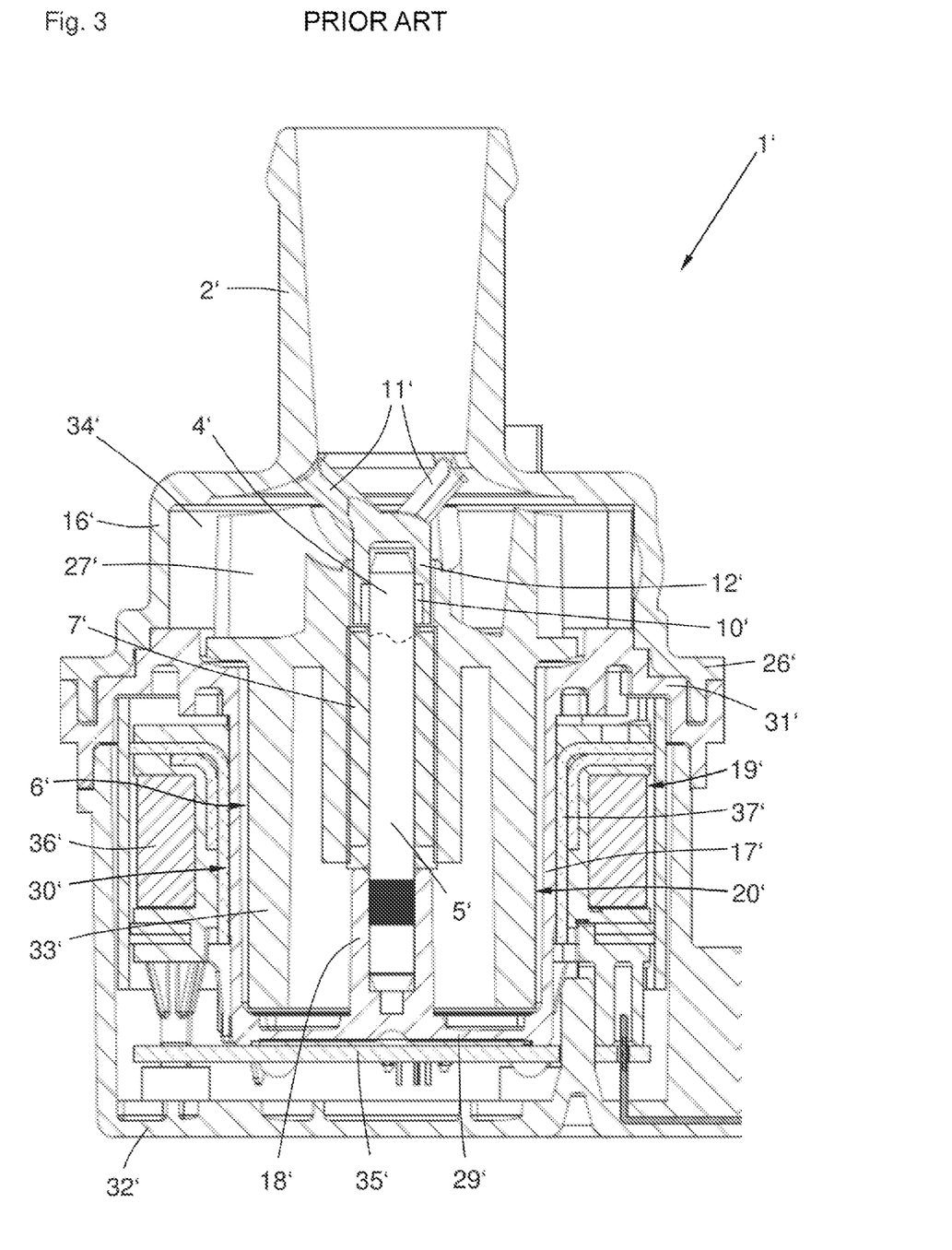
FIG. 3 is a centrifugal pump according to the prior art.

FIG. 3 shows a centrifugal pump 1' known from the prior art, with a pump head 16', which comprises a suction nozzle 2', spokes 11', a bearing support 12', and a pump head flange 26', a containment shell 30', which comprises a shell bottom 29', a can 17', a containment shell flange 31', and a shaft receptacle 18' protruding from the shell bottom 29', a pump impeller 6', which comprises a magnetic ring 33' and an adjoining vane 27', as well as a slide bearing 7', a stator 19', a permanent magnet rotor 20', a circuit board 35', and a stator housing 32'. The stator 19' and the circuit board 35' are accommodated in a dry chamber, which is delimited by the containment shell 30' and the stator housing 32'. The stator consists of a ring winding 36' and claw pole plates 37'. The pump impeller 6' is rotatably accommodated on a shaft 5' in a pump chamber 34' consisting of the pump head 16' and the can 30', the shaft being accommodated and supported in the shaft receptacle 18' and the bearing support 12'. In the bearing support 12', a counter bearing 10' is accommodated, which serves as an axial start-up for the slide bearing 7'. The spokes 11' connect the pump head 16' with the bearing support 12' in a straight line.

Figure 4:
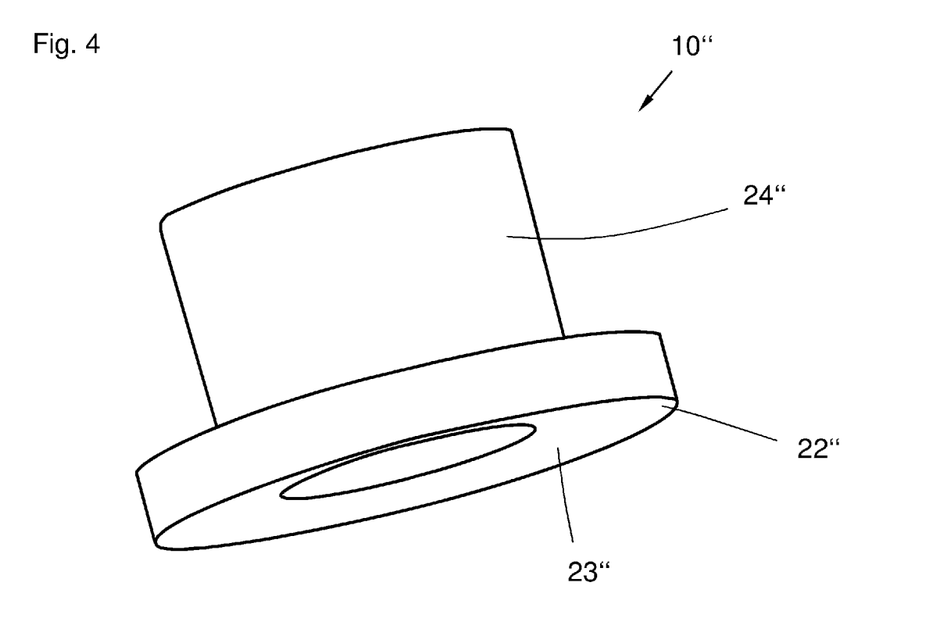
FIG. 4 is a counter bearing with annular collar.

FIG. 4 shows an alternative embodiment of a counter bearing 10", which comprises a first hollow cylinder 24" and an annular collar 22" that is concave at its front end. An axial counter bearing surface 23" is formed by the front end of the first hollow cylinder 24" and the annular collar 22".

Figure 5:
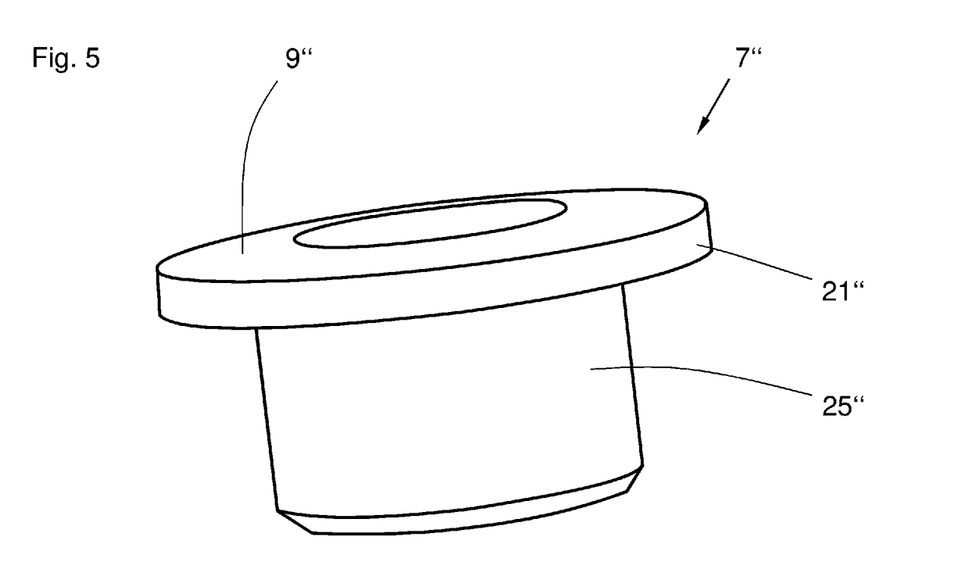
FIG. 5 is a slide bearing with annular collar.

FIG. 5 shows an alternative embodiment of a slide bearing 7", which comprises a second hollow cylinder 25" and an annular collar 21" that is convex at its front end. An axial bearing surface 9" is formed by the front end of the second hollow cylinder 25" and the annular collar 21".

Figure 6:
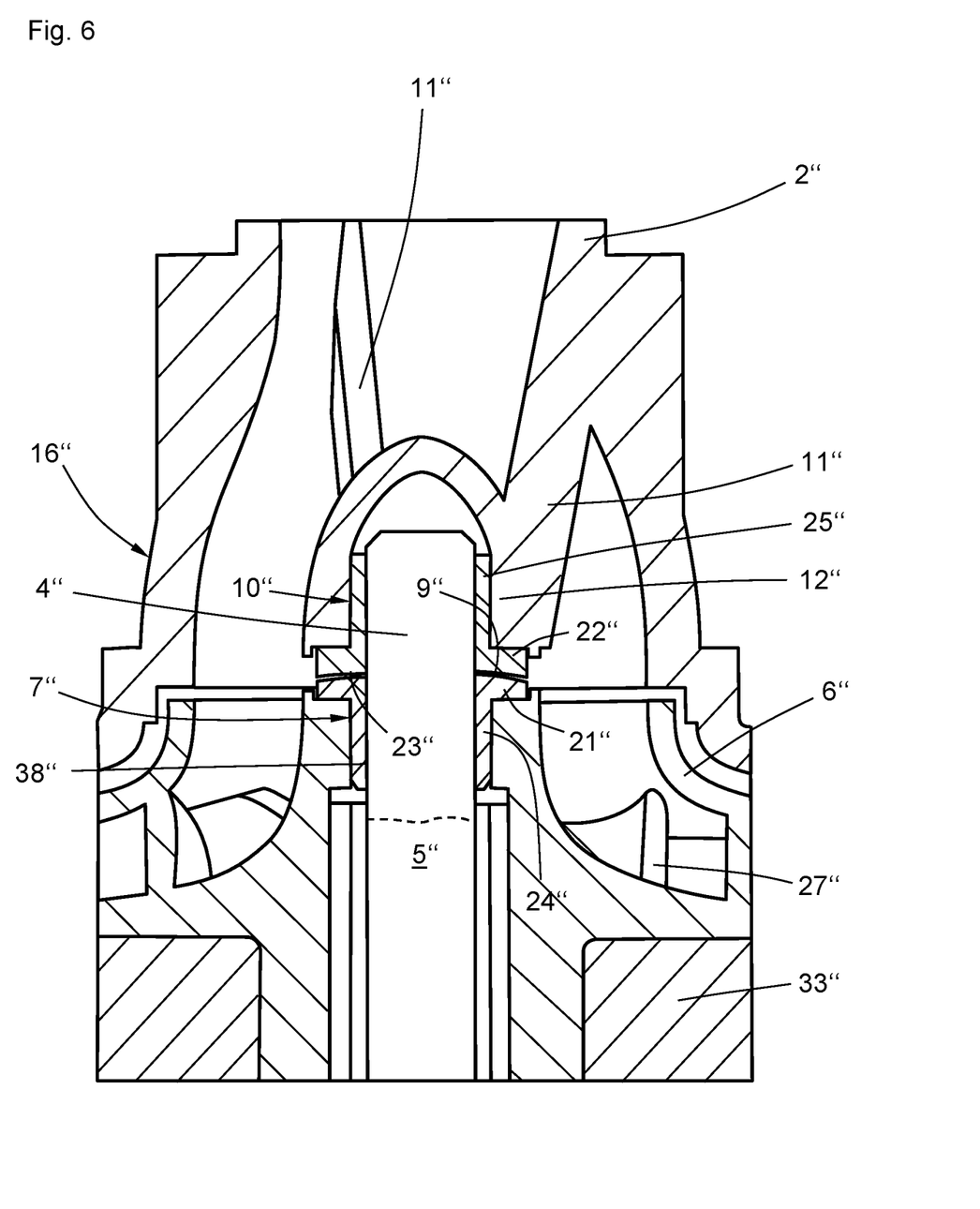
FIG. 6 is a sectional view of a second embodiment.

FIG. 6 shows a sectional view of a second embodiment of the invention, in which the alternative embodiments of the slide bearing 7" and the counter bearing 10" of FIGS. 4 and 5 are used. Shown are a pump head 16", which comprises spokes 11", a bearing support 12", and the counter bearing 10", a pump impeller 6", which comprises a vane 27", the slide bearing 7", and a magnetic ring 33", and a shaft 5", which is accommodated with a first region 4" in the counter bearing 10". The slide bearing 7" is fixedly connected to the pump impeller 6", and the counter bearing 10" is fixedly connected to the bearing support 12". An annular gap 38" is provided between the shaft 5" and the slide bearing 7". The convex axial bearing surface 9" and the concave counter bearing surface 23" result in a self-centering of the pump impeller 6". In this case, the radii of the concave or convex surfaces differ slightly from one another so that the two surfaces contact each other primarily in their region close to the shaft. Depending on the wear and tear, the size of the contacting surfaces can increase over the service life. The convex annular collar 21" and the concave annular collar 22" also serve as axial stop during mounting in the pump impeller 6" and in the bearing support 12", respectively.

Figure 7:
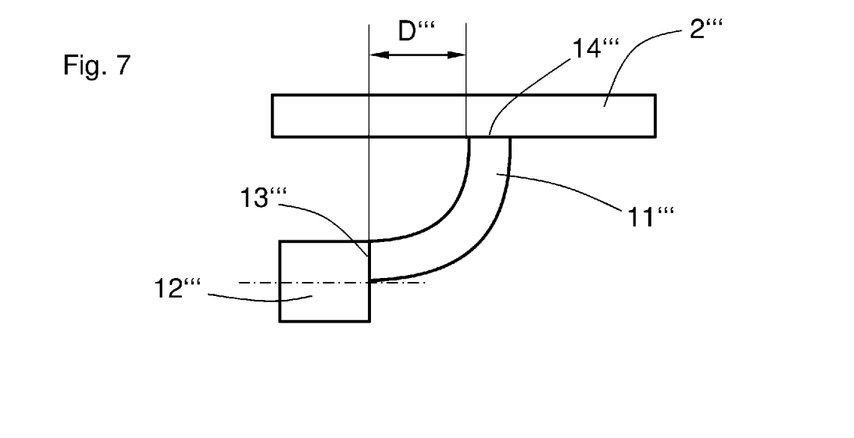
FIG. 7 is a stylized representation of a spoke.

FIG. 7 shows a stylized illustration of a spoke 11''', which does not have any inflection points 15 but protrudes radially from the suction nozzle 2''' and axially adjoins a bearing support 12'''. A transition region 13''' between the spoke 11''' and the bearing support 12''' is spaced apart from a transition region 14''' between the suction nozzle 2''' and the spoke 11''' by the length D'''.

Figure 8:
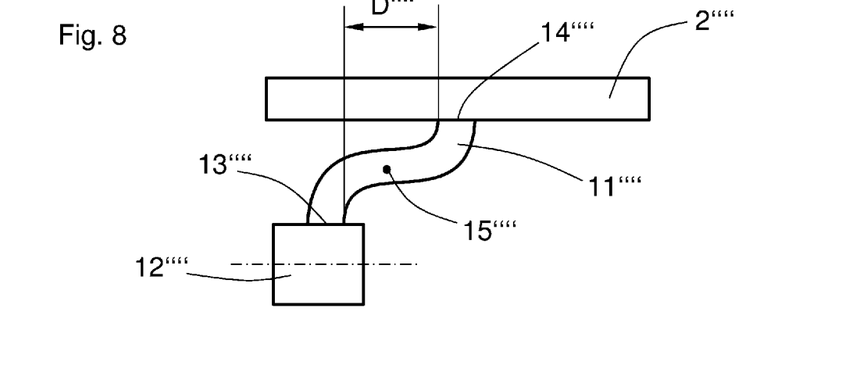
FIG. 8 is a variant of the spoke of FIG. 7.

FIG. 8 shows a stylized illustration of a variant of FIG. 7 with a suction nozzle 2'''', a spoke 11'''' and a bearing support 12''''. The spoke 11'''' has an inflection point 15''''. The spoke 11'''' protrudes radially from the suction nozzle 2'''' and radially adjoins the bearing support 12''''. A transition region 13'''' between the spoke 11'''' and the bearing support 12'''' is spaced apart from a transition region 14'''' between the suction nozzle 2'''' and the spoke 11'''' by the length D''''.

Figure 9:
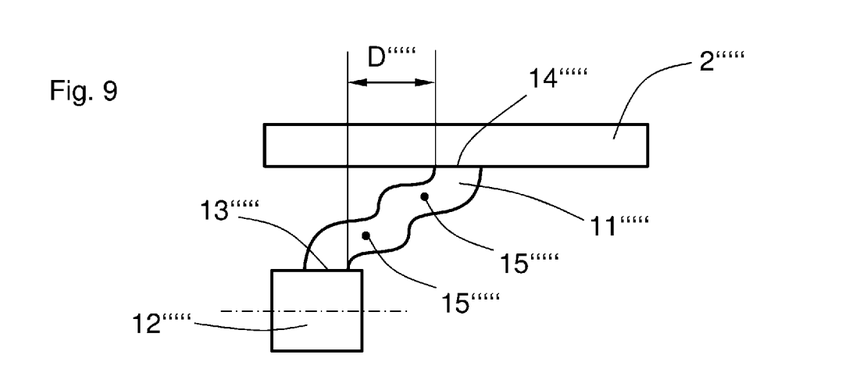
FIG. 9 is a second variant of the spoke of FIG. 7.

FIG. 9 shows a stylized illustration of another variant of FIGS. 7 and 8 with a suction nozzle 2''''', a spoke 11''''' and a bearing support 12'''''. The spoke 11''''' has two inflection points 15'''''. The spoke 11''''' protrudes radially from the suction nozzle 2''''' and radially adjoins the bearing support 12'''''. A transition region 13''''' between the spoke 11''''' and the bearing support 12''''' is spaced apart from a transition region 14''''' between the suction nozzle 2''''' and the spoke 11''''' by the length D'''''.

Transition geometries between these examples are also conceivable. The shape of the spoke can also deviate significantly from the illustrations. In particular, the cross-sectional surface of the spokes can change significantly along its progression.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS:

| | |
|---|---|
| 1 | Centrifugal pump |
| 2 | Suction nozzle |
| 3 | Discharge nozzle |
| 4 | First region |
| 5 | Shaft |
| 6 | Pump impeller |
| 7 | Slide bearing |
| 8 | Radial bearing surface |
| 9 | Axial bearing surface |
| 10 | Counter bearing |
| 11 | Spoke |
| 12 | Bearing support |
| 13 | First transition region |
| 14 | Second transition region |
| 15 | Inflection point |
| 16 | Pump head |
| 17 | Can |
| 18 | Shaft receptacle |

-continued

LIST OF REFERENCE SYMBOLS:

| | |
|---|---|
| 19 | Stator |
| 20 | Permanent magnet rotor |
| 21 | Convex annular collar |
| 22 | Concave annular collar |
| 23 | Axial counter bearing surface |
| 24 | First hollow cylinder |
| 25 | Second hollow cylinder |
| 26 | Pump head flange |
| 27 | Vane |
| 28 | Second region |
| 29 | Shell bottom |
| 30 | Containment shell |
| 31 | Containment shell flange |
| 32 | Stator housing |
| 33 | Magnetic ring |
| 34 | Pump chamber |
| 35 | Circuit board |
| 36 | Ring winding |
| 37 | Claw pole plate |

What is claimed is:

1. A centrifugal pump comprising:
   a pump housing including a pump head which forms a single part with a suction nozzle and a discharge nozzle;
   a bearing support;
   at least one spoke having first and second ends, the at least one spoke having the first end protruding radially from the suction nozzle through a first curved region to the second end that radially adjoins the bearing support to retain the bearing support in a central position within the pump head;
   a shaft having first and second ends;
   a counter bearing having a concave or a convex bearing surface, the counter bearing being retained in the bearing support for supporting the first end of the shaft;
   a pump impeller rotatably mounted on the shaft via a slide bearing secured in the pump impeller wherein the slide bearing has an inner cylindrical shell-shaped radial bearing surface and a convex or concave axial bearing surface, the axial bearing surface being axially supported on the concave or convex counter bearing surface of the counter bearing, respectively;
   the spoke retaining the bearing support in a central position within the pump head and having a containment shell, which separates a wet chamber from a dry chamber and in which the second end of the shaft is supported;
   a wound stator being accommodated in the dry chamber and a permanent magnet rotor of an electronically commutated direct-current motor being accommodated in the wet chamber and the permanent magnet rotor forming a structural unit with the pump impeller,
   wherein the slide bearing and the counter bearing each have a radially-outwardly protruding annular collar,
   wherein the concave or convex bearing surface of the slide bearing is formed on the annular collar of the slide bearing, and
   wherein the concave or convex bearing surface of the counter bearing is formed on the annular collar of the counter bearing.

2. The centrifugal pump according to claim 1, further comprising a second transition region in the at least one spoke, the first curved region being spaced apart in the axial direction from the second transition region in the spoke between the bearing support and the suction nozzle.

3. The centrifugal pump according to claim 2, wherein the first curved region does not axially overlap the second transition region.

4. The centrifugal pump according to claim 1, wherein the axial bearing surface of the slide bearing is convex and the counter bearing surface of the counter bearing is concave.

5. The centrifugal pump according to claim 1, wherein the axial bearing surface or the counter bearing surface is a ball ring section.

6. The centrifugal pump according to claim 1, wherein the at least one spoke forms a single part with the pump head.

7. The centrifugal pump according to claim 1, wherein the radii of the axial bearing surface of the slide bearing and the axial bearing surface of the counter bearing differ slightly from one another so that contact preferably occurs in the region near the shaft.

8. The centrifugal pump according to claim 1, further comprising a small annular gap provided between the shaft and the slide bearing.

9. The centrifugal pump according to claim 1, wherein the slide bearing and/or the counter bearing have a knurling on the outer circumference.

10. The centrifugal pump according to claim 1, wherein the slide bearing consists of steel and the counter bearing is made of plastic, or vice versa.

11. The centrifugal pump according to claim 1, wherein the slide bearing and/or the counter bearing are made of steel.

12. The centrifugal pump according to claim 1, wherein the slide bearing and/or the counter bearing are made of ceramic.

13. A pump head assembly comprising:
a pump head forming part of a pump housing, the pump head having a suction nozzle and a discharge nozzle;
a bearing support;
at least one spoke having first and second ends, the at least one spoke having the first end protruding radially from the suction nozzle through a first curved region to the second end that radially adjoins the bearing support to retain the bearing support in a central position within the pump head;
a shaft having first and second ends;
a counter bearing having a concave or a convex bearing surface, the counter bearing being retained in the bearing support for supporting the first end of the shaft; and
a pump impeller rotatably mounted on the shaft via a slide bearing secured in the pump impeller, wherein the slide bearing has an inner cylindrical shell-shaped radial bearing surface and a convex or concave axial bearing surface, the axial bearing surface being axially supported on the concave or convex counter bearing surface of the counter bearing, respectively,
wherein the slide bearing and the counter bearing each have a radially-outwardly protruding annular collar,
wherein the concave or convex bearing surface of the slide bearing is formed on the annular collar of the slide bearing, and
wherein the concave or convex bearing surface of the counter bearing is formed on the annular collar of the counter bearing.

14. The pump head assembly according to claim 13, further comprising a second transition region in the at least one spoke, the first curved region being spaced apart in the axial direction from the second transition region in the spoke between the bearing support and the suction nozzle.

15. The pump head assembly according to claim 13, wherein the axial bearing surface of the slide bearing is convex and the counter bearing surface of the counter bearing is concave.

16. The pump head assembly according to claim 13, wherein the at least one spoke forms a single part with the pump head.

17. The pump head assembly according to claim 13, wherein the radii of the axial bearing surface of the slide bearing and the axial bearing surface of the counter bearing differ slightly from one another so that contact preferably occurs in the region near the shaft.

18. The pump head assembly according to claim 13, wherein the slide bearing consists of steel and the counter bearing is made of plastic, or vice versa.

19. The pump head assembly according to claim 13, wherein the slide bearing and/or the counter bearing are made of steel.

* * * * *